3,451,891
PROCESS FOR THE PRODUCTION OF GLUTAMIC ACID
Roger L. Harned, Terre Haute, Ind., assignor to Commercial Solvents Corporation, New York, N.Y., a corporation of Maryland
No Drawing. Filed Dec. 17, 1965, Ser. No. 514,700
Int. Cl. C12d 13/00, 13/06
U.S. Cl. 195—47    11 Claims

ABSTRACT OF THE DISCLOSURE

Glutamic acid is produced from saccharide material containing excess growth factors (biotin) by absorbing the latter with microorganisms and then sterilizing said saccharide material containing said microorganisms and then using said sterilized saccharide material still containing the sterilized microorganism cells as the carbon source in a fermentation medium for producing glutamic acid.

---

This invention generally relates to a process for the production of glutamic acid by fermentation. In a particular aspect it relates to an improved nutrient medium for production of glutamic acid by fermentation.

Glutamic acid is produced in high yields by the fermentation of nutrient media with certain glutamic acid-producing strains of microorganisms. A satisfactory method for the production of glutamic acid is described in U.S. Patent No. 2,978,383 and U.S. Patent No. 2,978,384, both issued on Apr. 4, 1961, to Koichi Yamada. This method utilizes an aqueous nutrient medium comprising a carbohydrate source, a nitrogen source, a phosphate source, a potassium source, a magnesium source, and trace amounts of mineral salts. Briefly, the process for the production of glutamic acid involves incubating a glutamic acid-producing strain of the microorganism, *Brevibacterium divaricatum*, in an aqueous nutrient medium containing the above-mentioned ingredients. The fermentation is preferably carried out at temperatures ranging from about 30 to about 40° C. at a pH ranging from about 6 to about 9 under submerged conditions of agitation and aeration. The organisms of the genera Bacillus, Micrococcus, Brevibacterium, Microbacterium, Corynebacterium, Arthrobacter, and the like may also be used to produce glutamic acid by similar processes using similar nutrient media as are described in the art.

Crude sugar-containing saccharide materials, such as hydrolyzed starch, hydrol (the molasses remaining from hydrolyzed starch after crystallization of sugar) and beet and cane sugar molasses, including blackstrap molasses, are potentially excellent raw materials for the carbohydrate source in nutrient media used for the production of glutamic acid by fermentation. However, these crude saccharide materials are not satisfactory for glutamic acid production by fermentation because they contain excessive amounts of growth factors, such as biotin. Excessive amounts of growth factors are undesirable for glutamic acid production because they lead to prolific growth of the microorganism without concomitant production of glutamic acid. However, a small amount of growth factor is often beneficial for the production of glutamic acid. For example, biotin in an amount of from about 1 mcg. to 5 mcg. per 100 g. of carbohydrate was disclosed by Kinoshita in U.S. Patent 3,002,889 as being beneficial for the production of glutamic acid by the organism *Micrococcus glutamicus*. In general, an amount of biotin of more than 5 mcg./100 g. of the carbohydrate content of the crude carbohydrate is regarded as excessive for glutamic acid fermentation. The objectionable amount and identity of other growth factors, however, remains undetermined.

It is not fully understood why the presence of excessive amounts of growth factors leads to proliferation of the microorganism with little or no production of glutamic acid. According to one view, the large amount of biotin found in crude carbohydrate sources is the principal factor leading to failure of the microorganism to produce glutamic acid. Another view is that these crude carbohydrate sources contain unidentified growth factors other than biotin which adversely affect glutamic acid production.

The relation of the microorganism to the growth factors also is not well understood. It is a widely held belief that the growth factors become bound to cellular protein and are passed on to subsequent generations at the time of cell division. This explanation is supported by the discovery of Okumura et al., U.S. Patent 3,136,702, who treated a saccharide material having excessive biotin content with a microorganism, filtered off the microorganism, and found that the resulting saccharide material was free from excessive biotin making it suitable for use in a fermentation medium. Although this process successfully removes excess biotin, it has the disadvantage that the additional filtration step increases costs and reduces the savings made possible by use of crude carbohydrate material.

It is an object of this invention to provide a new process for the production of glutamic acid. It is another object of this invention to provide an improved nutrient medium for the production of glutamic acid by fermentation.

Still another object is to provide a nutrient medium in which excess growth factors are substantially unavailable for use in the production of glutamic acid by fermentation.

It is a further object of this invention to provide a method for using a crude saccharide material containing an undesirably high amount of growth factors in a glutamic acid fermentation process.

Other objects will be apparent to those skilled in the art from the description of this invention.

A new process has been discovered for the production of glutamic acid by the fermentation of a nutrient fermentation medium containing a carbohydrate source comprising the steps of treating a saccharide material containing growth factors with a microorganism (I) capable of removing the growth factors from the saccharide material, sterilizing the saccharide material containing said microorganism (I), cultivating a glutamic acid-producing microorganism (II) in a fermentation medium containing as the carbohydrate source the said sterilized saccharide material still containing the microorganism (I), and recovering glutamic acid therefrom.

By means of the new process the above-mentioned problems deriving from the use of crude saccharide material containing excessive amounts of growth factors, e.g. biotin, are lessened. Therefore, in the new process, it is possible to use a crude carbohydrate source as a raw material for the saccharide materials. Because the crude carbohydrate sources are generally more economical than refined carbohydrate sources, because treatment of the saccharide materials with a microorganism (I) capable of removing growth factors eliminates unsatisfactory fermentations due to excess growth factors, and because the filtration step of the previous process has been eliminated, the nutrient medium provided by the present process is an improvement over previous nutrient media used for the production of glutamic acid by fermentation using a glutamic acid-producing strain of microorganisms (II) such as *Micrococcus glutamicus*, *Brevibacterium divaricatum*, and the like.

Generally the process consists of treating a saccharide material containing an excessive amount of growth factors with a microorganism (I) capable of removing growth factors. The treated, unfiltered, sterilized saccharide material still containing the microorganism (I) is employed as the carbohydrate source in a fermentation medium. The treated saccharide material can be heat sterilized before adding other ingredients to form a complete fermentation medium; if the other ingredients have also been heat sterilized, the addition is made using an aseptic technique. Another satisfactory method is to sterilize the saccharide material, then add the remaining ingredients to form a complete fermentation medium and sterilize the resulting medium. A preferred method is to effect the sterilization of the saccharide material after it has been incorporated with the other ingredients of the fermentation medium.

Heat sterilization, as is known to those skilled in the art, can be carried out by heating the substance to be sterilized at an elevated temperature and pressure for a period of time sufficient to effect sterilization, e.g. for about 15 min. at about 10 p.s.i. of steam pressure. When a fermentation medium for the production of glutamic acid has been sterilized, it is cooled to ambient temperatures, e.g. 30° C., and is then inoculated with a glutamic acid-producing microorganism to produce glutamic acid, which is recovered as is known in the art, e.g. by the method of Yamada previously cited.

The ultimate fate of the growth factors during and following treatment of the saccharide material with the microorganism is not definitely known. According to various views, the growth factors may be absorbed inside the cells, adsorbed to the walls of the cells, or combined with the protoplasm of the cells.

The term "excessive amounts of growth factors" is intended to mean amounts of growth factors leading to prolific growth of the microorganism with little or no production of glutamic acid. A well-known method for measuring growth is by measurement of the transmission of light of 540 m$\mu$ wavelength through a sample of the fermentation medium which has been diluted with deionized water. The dilution employed in the tests described in this specification was 1 part of fermentation medium per 49 parts of water. As the microorganism grows during the fermentation period, the fermentation medium gradually becomes more opaque. When the fermentation is conducted in laboratory shake flasks according to Example 1, the fermentation is allowed to proceed for 48 hours at which time the glutamic acid is harvested. Ordinarily in the absence of excessive growth factors, the light transmission will be about 25% or greater and the glutamic acid produced will be more than 30 g./l. Conversely, ordinarily if excessive amounts of growth factors are present, the light transmission will be less than about 25% and the glutamic acid produced will be less than 30 g./l. When the fermentation is conducted on a plant scale in aerated fermentors, growth to greater opacities is satisfactory. When biotin is the sole growth factor, quantities of more than about 2.5 mcg. per 100 g. of saccharide are generally regarded as excessive for shake flask fermentations, and more than about 5 mcg. per 100 g. of saccharide material are regarded as excessive for plant-scale aerated fermentors. The present invention is directed to a method of treating a saccharide material and the foregoing is intended to facilitate the understanding thereof; however, it is not intended that the foregoing be construed as a limitation thereon.

Dependable chemical tests have not been developed for the assay of all growth factors. Those skilled in the art employ bioassay procedures to evaluate the level of growth factors in a material. One of the advantages of the present invention is that it is unnecessary to assay the growth factor content of saccharide material prior to use in fermentations. By employing the saccharide-treating step of this process, excessive amounts of growth factors are effectively removed from the saccharide material. Saccharide materials of unknown origin can therefore generally be used without further evaluation of growth factor content.

In general, any saccharide material can be used in the process of this invention, but the process is particularly useful with crude saccharide materials which previously could not be used because of excessive growth of the microorganisms without concomitant glutamic acid production. Such saccharide materials include acid- or enzyme-hydrolyzed crude starch such as hydrolyzed potato starch or that which is obtained by the hydrolysis of ground cereal grains, hydrol (the molasses residue remaining after separation of sugar from hydrolyzed starch) crude sugar syrup, beet molasses and cane molasses including blackstrap molasses. The process is also beneficial when it is desirable to substantially eliminate all growth factors from the saccharide employed as the carbohydrate source, even though the amount of such growth factors is not excessive, so that the total growth factor level of the fermentation medium can be more carefully controlled.

The microorganisms (I) which can be used in the practice of the new process are those which effectively reduce the amount of growth factors to a level where they do not adversely affect glutamic acid production. They should be metabolically active cells, preferably from a freshly growing culture. Suitable microorganisms (I) may themselves be glutamic acid-producers and in a preferred process, the same microorganism is employed for treating the saccharide material as for producing glutamic acid. Examples of microorganisms (I) suitable both for treating the saccharide material and for glutamic acid production include *Brevibacterium divaricatum*, *Micrococcus glutamicus*, *Brevibacterium lactofermentum*, *Bacillus subtilis*, *Micrococcus varians*, *Microbacterium flavum*, *Corynebacterium lilium*, and *Arthobacter glofiformis*. Examples of microorganisms (I) suitable for treating the polysaccharide material but not suitable for glutamic acid production include *Saccharomyces bisporus*, and *Torula* sp. ATCC. No. 14750. *Brevibacterium divaricatum* is a preferred microorganism (I) in the practice of this invention.

The conditions of pH and temperature for the saccharide-treating step may vary widely. In general, it is preferred that the pH be near neutral. If the saccharide material is derived from acid-hydrolysis of starch, it is preferred to neutralize it with ammonium hydroxide prior to addition of the microorganism (I). The preferred temperature range is that of "groom" temperature, e.g. from about 20° C. to about 35° C., but the process can be conducted at a temperature of from near freezing (0° C.) to about 50° C.

The amount of cells of the microorganism (I) to be used should be of sufficient magnitude that the growth factors are removed to a satisfactory extent in the time period desired. In general the addition of about 10% by volume, based on the volume of the saccharide material, of a culture having a light transmission, when diluted, of about 25% is sufficient. The cells can be added as an aqueous suspension if desired, or they can be filtered from the nutrient medium in which they are growing and added promptly to the saccharide materials.

The time required for treatment of the saccharide material by the microorganism varies. Generally the removal of the excessive growth factor by the microorganism (I) is very rapid. If a large volume of active cells is employed, as little as 1 minute may be sufficient, but if the cells are inactive, or the volume is small, or the temperature is low, as long as 60 minutes may be required. Generally from 15 to 45 minutes, usually about 30 minutes at ambient temperatures, is adequate. The treated saccharide material still containing the cells of the microorganism (I) is then employed as the carbohydrate source in a fermentation medium for the production of glutamic acid by procedures well known to those skilled in the art.

The practice of this invention is further illustrated by the following examples:

EXAMPLE 1

Crude cereal grain starch, 510 g. was suspended in 2700 ml. of tap water and hydrolyzed with sulfuric acid in a manner known to those skilled in the art. After the hydrolysis, the acidity was neutralized with ammonium hydroxide to approximately pH 7. The total biotin content was found to be 6.18/ml. A 200-ml. portion of the hydrolyzate was transferred to a 500 ml. flask and 20 ml. of a 16-hour culture of Brevibacterium divaricatum was added.

The culture was prepared by inoculating 50 ml. of a medim having the following composition with one loopfull of a culture of Brevibacterium divaricatum (NRRL B-2311):

| | | |
|---|---|---|
| Glucose | percent by weight | 4 |
| Urea | percent | 0.8 |
| Dipotassium phosphate | do | 0.1 |
| Magnesium sulfate | do | 0.05 |
| Ferrous sulfate ($FESO_4 \cdot 7H_2O$) | p.p.m. | 4 |
| Manganese sulfate ($MnSO_4 \cdot H_2O$) | p.p.m. | 4 |
| BYF (autolyzed yeast) | percent | 0.4 |

The above culture was incubated for 16 hours at which time it had a light transmission of about 25% and contained about 12 grams per liter of cells on a dry weight basis.

After the Brevibacterium divaricatum cells were added to the hydrolyzed starch, the mixture was stirred for 30 minutes at 35° C. and a portion still containing cells of the microorganism was then employed as the carbohydrate source in a fermentation medium having the following composition:

| | | |
|---|---|---|
| Carbohydrate, glucose equivalent | g | 10 |
| Urea | g | 0.4 |
| Dipotassium phosphate ($K_2HPO_4$) | g | 0.1 |
| Magnesium sulfate ($MgSO_4 \cdot 7H_2O$) | g | 0.05 |
| Manganese sulfate ($MnSO_4 \cdot H_2O$) | p.p.m. | 4 |
| Ferrous sulfate ($FeSO_4 \cdot 7H_2O$) | p.p.m. | 4 |
| Adjust pH with NaOH solution to | | 7.0 |
| Tap water, q.s. | ml | 100 |

The above nutrient medium was then sterilized for 15 minutes at 10 p.s.i. steam pressure. After cooling to room temperature 20 ml. aliquots were aseptically transferred to sterile 500 ml. fermentation flasks and the flasks were inoculated with 1 ml. of a 16-hour culture of Brevibacterium divaricatum prepared as previously described.

After inoculation, the fermentation flasks were incubated for 48 hours at a temperature of 29–31° C., and a pH of 6–8 was maintained with urea throughout the fermentation. The flasks were agitated throughout the fermentation by rotary shaking at 300 r.p.m. A control was run by preparing one flask containing fermentation medium prepared with hydrolyzed starch which had not been treated with the cells.

At the end of the fermentation period, the flasks were assayed for glutamic acid production. The percentage light transmission was also measured as an indication of the degree of growth, the heavier the growth the less the light transmission. The data in the following table show that the use of treated saccharide material gives good yields of glutamic acid at moderate growth of the organism, but untreated saccharide resulted in low yield at heavy growth.

| Flask No. | Percent T. | Glutamic acid, g./l. |
|---|---|---|
| 1 | 28 | 37.2 |
| 2 | 29.5 | 38.3 |
| 3 | 29 | 39.2 |
| 4 | 26 | 36.1 |
| Control | 19 | 25 |

EXAMPLES 2–8

The procedure of Example 1 is repeated except that a glutamic acid-producing strain of each of the following organisms is employed in both the growth factor removal stage and the glutamic acid producing stage.

| | Example |
|---|---|
| Micrococcus glutamicus | 2 |
| Bacillus subtilis | 3 |
| Micrococcus varians | 4 |
| Microbacterium flavum | 5 |
| Corynebacterium lilium | 6 |
| Arthobacter glofiformis | 7 |
| Brevibacterium lactofermentum | 8 |

EXAMPLE 9

An aqueous beet molasses solution having a glucose equivalent of 10 g./100 ml. and a biotin content of 10 mcg. per 100 g. of carbohydrate is treated with a culture of Saccharomyces bisporus for 30 minutes by the procedure described in Example 1 to reduce the biotin content to below 5 mcg. per 100 g. of saccharide. The treated molasses still containing the cells of the microorganism is then employed as the carbohydrate source in the preparation of a nutrient medium and sterilized according to Example 1. The medium is placed in a 500 ml. fermentation flask and is inoculated with Brevibacterium divaricatum and fermented to produce glutamic acid in accordance with Example 1. After 48 hours the glutamic acid is recovered therefrom.

EXAMPLES 10–13

The procedure of Example 1 is repeated with each of the following crude carbohydrate sources:

| | Example |
|---|---|
| Cane sugar molasses | 10 |
| Hydrol | 11 |
| Hydrolyzed potato starch | 12 |
| Blackstrap molasses | 13 |

Good yields of glutamic acid at moderate growth of the microorganism are obtained.

EXAMPLE 14

The procedure of Example 1 is repeated except that the saccharide material is sterilized in a separate step prior to employing it as the carbohydrate source in the preparation of the fermentation medium.

What is claimed is:

1. A process for the production of glutamic acid by cultivating a glutamic acid-producing microorganism in a nutrient fermentation medium containing a carbohydrate source, and recovering said glutamic acid therefrom, comprising the steps of:

(a) treating a saccharide material containing excess growth factors with a microorganism (I) capable of removing said excess growth factors from the saccharide material by absorption inside the cell, adsorbed to the walls of the cells, or combined with the protoplasm of the cells, thereby effecting a reduction in the amount of said growth factors, (b) sterilizing said saccharide material containing said microorganism (I), (c) cultivating a glutamic acid-producing microorganism (II) in a fermentation medium containing said sterilized saccharide material as said carbohydrate source and still containing the sterilized cells of said organism (I), thereby producing said glutamic acid.

2. The process of claim 1 wherein the microorganism (I) of step (a) is the glutamic acid-producing microorganism (II) of step (c).

3. The process of claim 1 wherein the microorganism of steps (a) and (c) is Brevibacterium divaricatum.

4. The process of claim 1 wherein the microorganism (I) is different from the microorganism (II).

5. The process of claim 1 wherein the microorganism (I) of step (a) is *Saccharomyces bisporus* and the microorganism (II) of step (c) is *Brevibacterium divaricatum*.

6. In a process for the production of glutamic acid by the fermentation of a nutrient fermentation medium containing a carbohydrate source by cultivating a glutamic acid-producing microorganism therein and recovering glutamic acid therefrom, the steps comprising:
   (a) treating a saccharide material containing excess biotin with a microorganism (I) capable of removing biotin from said saccharide material by absorbing said biotin inside the cells of said microorganism, thereby effecting a reduction in the amount of said growth factors,
   (b) sterilizing said treated saccharide material containing said microorganism (I), and
   (c) cultivating a glutamic acid-producing microorganism (II) in a fermentation medium containing said sterilized saccharide material as said carbohydrate source and still containing the sterilized cells of said microorganism (I) to produce glutamic acid.

7. The process of claim 1 wherein the saccharide material is selected from the group consisting of acid-hydrolyzed starch, enzyme-hydrolyzed starch, hydrol, beet sugar molasses, cane sugar molasses, and crude sugar syrup.

8. The process of claim 1 wherein the saccharide material is treated for a period of time of from about 1 minute to about 60 minutes at a temperature of from about 5° C. to about 50° C.

9. The process of claim 1 wherein the saccharide material is treated with a microorganism selected from the group consisting of:

*Micrococcus glutamicus*
*Bacillus subtilis*
*Micrococcus varians*
*Microbacterium flavum*
*Corynebacterium lilium*
*Arthobacter glofiformis*
*Brevibacterium lactofermentum*
*Brevibacterium divaricatum*

10. A process for the production of glutamic acid by cultivating a glutamic-acid producing microorganism in a nutrient fermentation medium containing a carbohydrate source, a nitrogen source, a phosphorous source, a potassium source, a magnesium source, and a source of trace amounts of mineral salts comprising the steps of:
   (a) treating a saccharide material containing growth factors with a microorganism (I) selected from the group consisting of *Brevibacterium divaricatum*, *Micrococcus glutamicus*, *Brevibacterium lactofermentum*, *Bacillus subtilis*, *Micrococcus varians*, *Microbacterium flavum*, *Corynebacterium lilium*, *Arthobacter glofiformis*, *Saccharomyces bisporus* and *Torula*,
   (b) sterilizing said treated saccharide material containing said microorganism,
   (c) cultivating a glutamic acid-producing microorganism (II) selected from the group consisting of *Brevibacterium divaricatum*, *Micrococcus glutamicus*, *Bacillus subtilis*, *Micrococcus varians*, *Microbacterium flavum*, *Corynebacterium lilium*, *Arthobacter glofiformis* and *Brevibacterium lactofermentum* in a fermentation medium containing said sterilized saccharide material and still containing cells of the microorganism (I) of step (a), to produce glutamic acid, and
   (d) recovering glutamic acid therefrom.

11. The process of claim 10 wherein the saccharide material is treated for a period of from about 5 minutes to about 45 minutes at a temperature of from about 10° C. to about 40° C.

References Cited
UNITED STATES PATENTS 3,136,702 6/1964 Okumura et al. _____ 195—47
3,212,994 10/1965 Kono et al. _____ 195—29

LIONEL M. SHAPIRO, *Primary Examiner.*

U.S. Cl. X.R.

195—29